United States Patent Office 3,128,276  
Patented Apr. 7, 1964

3,128,276  
OPTIONALLY α-SUBSTITUTED 1-AMINO-2,3, OR 4 - (CYCLOHEXYL/ - PHENYL)METHYLPIPERI-DINES AND PRECURSORS  
Kurt J. Rorig, Glenview, Ill., assignor to G. D. Searle & Co., Chicago, Ill., a corporation of Delaware  
No Drawing. Filed Sept. 9, 1960, Ser. No. 54,862  
5 Claims. (Cl. 260—293)

This invention relates to cyclic hydrazines comprising a piperidine nucleus substituted on the nitrogen atom by an amino radical and on one of the carbon atoms by a carbocyclic radical attached via an optionally substituted methylene bridge. More particularly, this invention relates to cyclic hydrazines of the formula

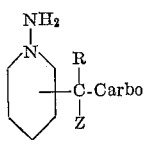

wherein Carbo designates the carbocyclic radical referred to above, R represents hydrogen or a hydroxy radical, and Z represents hydrogen or a phenyl radical.

Among the carbocyclic radicals adapted to the purposes of this invention, especially cycloalkyl groupings such as cyclopentyl and cyclohexyl, and aromatic groupings such as phenyl and naphthyl, are preferred.

Equivalent to the foregoing basic hydrazines of this invention are non-toxic acid addition and quaternary ammonium salts thereof, the compositions of which may be symbolized by

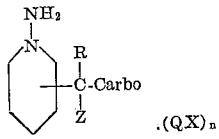

.(QX)ₙ wherein Carbo, R, and Z have the meanings previously set forth; Q is selected from among hydrogen and lower alkyl, hydroxy(lower alkyl), and lower alkenyl radicals, as also such aralkyl radicals as benzyl, phenethyl, and naphthylmethyl; X is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and n is a positive integer less than 3.

The compounds to which this invention relates are useful because of their valuable pharmacological properties. Thus, for example, they are antibiotic and anti-fungal agents effective against *B. subtilis, E. coli, Trichophyton mentagrophytes*, and like organisms, and they also affect the central nervous system. Their antibiotic activity is the more remarkable because of the absence of this utility in compounds lacking the hydrazine function but otherwise superficially related. Such compounds as 1-(2-diethylaminoethyl)-α,α-diphenyl-4-piperidinemethanol and 1-(2-diethylaminoethyl)-α,α-diphenyl-2 - piperidinemethanol, products of applicant's copending application Serial No. 813,339, filed May 15, 1959, are without effect on *B. subtilis* and *E. coli* in standardized tests for antibiotic response, whereas the corresponding hydrazines herein disclosed and claimed, illustratively 1-amino-α,α-diphenyl-2-piperidinemethanol, significantly inhibit the growth of these organisms under identical conditions of test.

Manufacture of the subject compositions proceeds by lithium aluminum hydride reduction of the 1-nitroso precursors

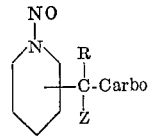

in an inert ethereal solvent medium, temperatures being most desirably maintained below 35° C. for reaction times ordinarily upwards of 2 hours. Carbo, R, and Z in the formula for the precursors have the same meanings assigned before. Conversion of the free bases of this invention to corresponding acid addition salts is accomplished by simple admixture thereof with 1 or 2 equivalents of any of various inorganic or strong organic acids, the anionic portion of which conforms to X as hereinabove defined. The quaternary ammonium compounds comprehended are those derived by contacting a claimed base with an organic ester of the formula

Q—X

Q and X being limited by the meanings previously assigned. Either 1 or 2 Q—X aggregates may be incorporated, quaternization taking place in the temperature range between 25–100° C. in the presence of an inert solvent such as chloroform, acetone, butanone, methanol, butanol, or the like. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70° C., the reaction time being approximately 1 hour.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

EXAMPLE 1

(A) *2-benzyl-1-nitrosopiperidine.*—To a solution of 350 parts of 2-benzylpiperidine and 242 parts of 36% hydrochloric acid in 2000 parts of water at 75° is added, with agitation during 2 hours, a solution of 144 parts of sodium nitrite in 1000 parts of water. Agitation at 75° is continued for 2 hours after the addition is completed, whereupon the pale yellow oil thrown down is extracted with ether. The ether extract is dried over anhydrous sodium sulfate and stripped of solvent by distillation. The residue is 2-benzyl-1-nitrosopiperidine.

(B) *1-amino-2-benzylpiperidine.*—To a solution of 98 parts of lithium aluminum hydride in 2230 parts of anhydrous ether at the boiling point under reflux is added, with agitation during 1½ hours, a solution of 380 parts of 2-benzyl-1-nitrosopiperidine in 2840 parts of anhydrous ether. Agitation at the boiling point under reflux is continued for 1 hour after the addition is completed, whereupon the suspension which results is cooled at 0–5° during decomposition of the organometallic complex formed in process by addition, seriatim, of 103 parts of water, 95 parts of aqueous 20% sodium hydroxide, and 361 parts of water. The white granular precipitate which appears is removed by filtration, and the filtrate is stripped of solvent by distillation. The slightly yellow oily residue is the desired 1-amino-2-benzylpiperidine. The product has the formula

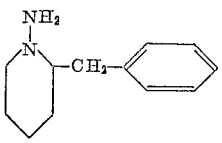

(C) *1-amino-2-benzylpiperidine dihydrochloride.*—A solution of 15 parts of 1-amino-2-benzylpiperidine in 80 parts of absolute ethanol is made slightly acid with hydrogen chloride and then diluted with 530 parts of anhydrous ether. The 1-amino-2-benzylpiperidine dihydrochloride thus precipitated, filtered off and dried in air, melts at approximately 138°. The melting point must be rapidly determined because the dihydrochloride is unstable at elevated temperatures and/or pressures, being converted to the monohydrochloride under these conditions.

EXAMPLE 2

(A) *2-(cyclohexylmethyl)piperidine.*—A solution of 100 parts of 2-benzylpyridine in 720 parts of ethanol in which is suspended 1 part of ruthenium dioxide is maintained with agitation at 100° under hydrogen at a pressure of 800 pounds per square inch until hydrogen uptake ceases. The resultant mixture is filtered, and the filtrate is stripped of solvent by vacuum distillation. The residue, a water-white oil, upon vacuum distillation affords 2-(cyclohexylmethyl)piperidine, boiling at 88–94°/2 mm. pressure. The product solidifies on standing and melts at 38–42°.

(B) *2-(cyclohexylmethyl)piperidine hydrochloride.*—From an ethanolic solution of the base of the foregoing Part A of this example, upon acidification with ethanolic hydrogen chloride and subsequent dilution with anhydrous ether, there precipitates 2-(cyclohexylmethyl)piperidine hydrochloride, which melts at 208–209.5°.

(C) *2 - cyclohexylmethyl-1-nitrosopiperidine.*—Substitution of 362 parts of 2-(cyclohexylmethyl)piperidine for the 350 parts of 2-benzylpiperidine called for in Example 1(A) affords, by the procedure there detailed, 2-cyclohexylmethyl-1-nitrosopiperidine, as a pale yellow oil.

(D) *1 - amino-2-(cyclohexylmethyl)piperidine.*—To a solution of 150 parts of lithium aluminum hydride in 3500 parts of anhydrous ether is added, with agitation and at a rate just sufficient to induce gentle boiling under reflux, a solution of 565 parts of 2-cyclohexylmethyl-1-nitrosopiperidine in 3500 parts of anhydrous ether. When the addition is completed (representatively, after 2 hours), the reactants are heated for a further 2 hours at the boiling point under reflux, then cooled and finally decomposed by the slow consecutive addition of 154 parts of water, 141 parts of aqueous 20% sodium hydroxide, and 540 parts of water. The resultant mixture is filtered to remove solid inorganics, then stripped of solvent by distillation at atmospheric pressures. Vacuum distillation of the residue affords the desired 1-amino-2-(cyclohexylmethyl)piperidine, boiling in the range 85–95° at 1.0 mm. pressure. The product has the formula

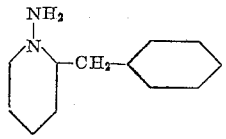

(E) *1 - amino-2-(cyclohexylmethyl)piperidine hydrochloride.*—To a solution of 15 parts of 1-amino-2-(cyclohexylmethyl)piperidine in 48 parts of absolute ethanol is added 3 parts of hydrogen chloride. The resultant solution is warmed and diluted with 800 parts of anhydrous ether to precipitate ivory blades of 1-amino-2-(cyclohexylmethyl)piperidine hydrochloride. The product, collected on a filter and dried in air, melts at 141–144°.

EXAMPLE 3

(A) *1-nitroso-α-phenyl-2-piperidinemethanol.*—Substitution of 380 parts of α-phenyl-2-piperidinemethanol for the 350 parts of 2-benzylpiperidine called for in Example 1(A) affords, by the procedure there detailed, 1-nitroso-α-phenyl-2-piperidinemethanol.

(B) *1 - amino-α-phenyl-2-piperidinemethanol.*—Substitution of 408 parts of 1-nitroso-α-phenyl-2-piperidinemethanol for the 380 parts of 2-benzyl-1-nitrosopiperidine called for in Example 1(B) affords, by the procedure there detailed, 1-amino-α-phenyl-2-piperidinemethanol, of the formula

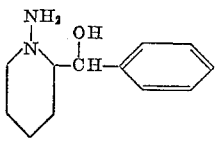

EXAMPLE 4

(A) *4-diphenylmethyl-1-nitrosopiperidine.*—To a suspension of 503 parts of 4-(diphenylmethyl)-piperidine in 2000 parts of water is added, with vigorous agitation, 240 parts of 36% hydrochloric acid. The resultant mixture is heated to 75–80° and maintained thereat with agitation while a solution of 144 parts of sodium nitrite in 1100 parts of water is added over a 45-minute period. Heating at approximately 80° is continued for 1¾ hours after addition of the nitrite is completed, whereupon the reactants are cooled to room temperature and filtered. The solid product thus isolated is 4-diphenylmethyl-1-nitrosopiperidine, which, upon recrystallization from ligroin, melts at approximately 162–163°.

(B) *1 - amino-4 - (diphenylmethyl)piperidine.* — Approximately 54 parts of 4-diphenylmethyl-1-nitrosopiperidine is continuously extracted with the condensate from a solution of 14 parts of lithium aluminum hydride in 710 parts of anhydrous ether at the boiling point under reflux. After 24 hours, the extraction is stopped and the ethereal solution is decomposed by adding 15 parts of water, 14 parts of aqueous 20% sodium hydroxide, and 52 parts of water, in that order. Precipitated solids are removed by filtration, and the filtrate is stripped of solvent by distillation. The residual viscous, pale-yellow oil is 1-amino-4-(diphenylmethyl)piperidine, of the formula

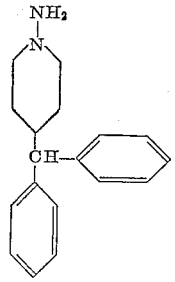

(C) *1-amino-4-(diphenylmethyl)piperidine hydrochloride.*—To a solution of 120 parts of 1-amino-4-(diphenylmethyl)piperidine in 560 parts of absolute ethanol is added 14 parts of hydrogen chloride followed by 1225 parts of anhydrous ether. The 1-amino-4-(diphenylmethyl)piperidine hydrochloride which precipitates, recovered on a filter and dried in air, melts at approximately 262–263°.

EXAMPLE 5

(A) *α-Cyclohexyl-α-phenyl-4-pyridinemethanol hydrochloride.*—To a solution of cyclohexylmagnesium chloride prepared from 32 parts of chlorocyclohexane and approximately 7 parts of magnesium in 350 parts of anhydrous ether at temperatures of the order of 5° is added a solution of 27 parts of 4-benzoylpyridine in 490 parts of anhydrous ether. The resultant mixture is heated at the boiling point under reflux for ½ hour, then poured onto a mixture of 120 parts of concentrated hydrochloric acid and 500 parts of ice. The α-cyclohexyl-α-phenyl-4-pyridinemethanol hydrochloride which precipitates is collected on a filter and dried in air.

(B) *α-Cyclohexyl-α-phenyl-4-piperidinemethanol hydrochloride.*—A suspension of 10 parts of α-cyclohexyl-α-phenyl-4-pyridinemethanol hydrochloride and 1 part of platinum oxide in approximately 100 parts of ethanol is maintained with agitation at approximately 25° in contact with hydrogen at 50 pounds per square inch pressure until hydrogen uptake ceases. The suspension is then filtered, and the filtrate is stripped of solvent by vacuum distillation. The residue is α-cyclohexyl-α-phenyl-4-piperidinemethanol hydrochloride.

(C) *α - Cyclohexyl - 1 - nitroso-α-phenyl-4-piperidinemethanol.*—To 31 parts of α-cyclohexyl-α-phenyl-4-piperidinemethanol hydrochloride suspended in 500 parts of water at approximately 75° is added, with vigorous agitation during 2 hours, a solution of 8 parts of sodium nitrite in 70 parts of water. The resultant mixture is maintained at 75° with agitation for a further 3 hours, whereupon it is cooled and extracted with ether. The ether extract, dried over calcium sulfate and stripped of solvent by distillation, affords as the residue, α-cyclohexyl-1-nitroso-α-phenyl-4-piperidinemethanol.

(D) *1-amino-α-cyclohexyl-α-phenyl-4-piperidinemethanol.*—To a solution of 7 parts of lithium aluminum hydride in 140 parts of anhydrous ether is added, with agitation during approximately 1 hour, a solution of 26 parts of α-cyclohexyl-1-nitroso-α-phenyl-4-piperidinemethanol in 490 parts of anhydrous tetrahydrofuran. Upon completion of the addition, the reactants are heated at the boiling point under reflux for ½ hour, then cooled at 0–5° while the organometallic complex formed in process is decomposed by the consecutive addition of 14 parts of water, 13 parts of aqueous 20% sodium hydroxide, and 49 parts of water. The resultant mixture is filtered, and the filtrate is stripped of solvent by vacuum distillation to obtain the desired 1-amino-α-cyclohexyl-α-phenyl-4-piperidinemethanol as the residue. The product has the formula

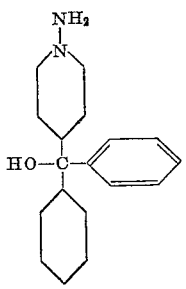

EXAMPLE 6

(A) *1-nitroso-α,α-diphenyl-2-piperidinemethanol.*—To a suspension of 304 parts of α,α-diphenyl-2-piperidinemethanol hydrochloride in 1000 parts of water is added, with vigorous agitation during 35 minutes at temperatures of the order of 75°, a solution of 72 parts of sodium nitrite in 500 parts of water. Agitation at 75° is continued for 2 hours longer, whereupon the reactants are cooled to room temperature and filtered. The solid product thus isolated is 1-nitroso-*a,a*-diphenyl-2-piperidinemethanol which, recrystallized from ethanol, melts at 178–180°.

(B) *1-amino-α,α-diphenyl-2-piperidinemethanol.* — To a solution of 130 parts of lithium aluminum hydride in 1400 parts of ether is added, with agitation at 20–25° during 45 minutes, a solution of 254 parts of 1-nitroso-α,α-diphenyl-2-piperidinemethanol in 3100 parts of tetrahydrofuran. The resultant mixture is heated to the boiling point and maintained thereat under reflux for 45 minutes, whereupon it is chilled to 0–5° and then decomposed by the sequential slow addition of 139 parts of water, 127 parts of aqueous 20% sodium hydroxide, and 487 parts of water. Precipitated solids are filtered off and extracted with approximately 9000 parts of boiling tetrahydrofuran, and this extract is added back to the filtrate. The combined filtrate and extract is stripped of solvent by vacuum distillation. The residue, recrystallized from benzene, melts at 223–226°. This material is 1-amino-α,α-diphenyl-2-piperidinemethanol, of the formula

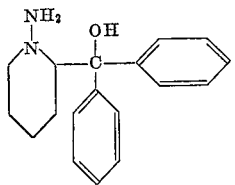

What is claimed is:
1. A compound of the formula

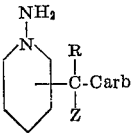

wherein Carb represents a member of the class consisting of carbocyclic radicals having the formulas

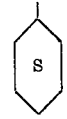

in which the letter S confirms that the ring in which it appears is saturated as shown, R represents a member of the class consisting of hydrogen and hydroxyl, and Z represents a member of the class consisting of hydrogen and a radical having the formula

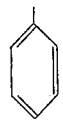

2. 1-amino-2-benzylpiperidine.
3. 1-amino-2-(cyclohexylmethyl)piperidine.
4. 1-amino-4-(diphenylmethyl)piperidine.
5. 1-amino-α,α-diphenyl-2-piperidinemethanol.

References Cited in the file of this patent

Braun et al.: Deutsche Chemische Gesellschaft (Berichte), vol. 64 B, page 1872 (1872).
Hanna et al.: Journal of the American Chemical Society, vol. 74, 3693 and 3694 (1952).